(12) United States Patent  
Leister (10) Patent No.: US 8,456,514 B2  
(45) Date of Patent: Jun. 4, 2013

(54) 3D DISPLAY DEVICE WITH CONTROLLABLE DEVICE FOR TRACKING VISIBILITY REGIONS

(75) Inventor: Norbert Leister, Dresden (DE)

(73) Assignee: Seereal Technologies S.A., Munsbach (LU)

(*) Notice: Subject to any disclaimer, the term of this patent is extended or adjusted under 35 U.S.C. 154(b) by 537 days.

(21) Appl. No.: 12/779,072

(22) Filed: May 13, 2010

(65) Prior Publication Data

US 2010/0289870 A1 Nov. 18, 2010

(51) Int. Cl.
*H04N 5/89* (2006.01)
*H04N 13/00* (2006.01)
*G11B 11/00* (2006.01)
*G11B 7/00* (2006.01)
*G03H 1/10* (2006.01)

(52) U.S. Cl.
USPC ............ 348/40; 369/13.32; 369/103; 359/10; 359/34

(58) Field of Classification Search
USPC .......................................... 348/40
See application file for complete search history.

(56) References Cited

U.S. PATENT DOCUMENTS 3,980,395 A 9/1976 Giallorenzi et al.
6,816,140 B2 11/2004 Fujieda

FOREIGN PATENT DOCUMENTS

EP 1 776 614 4/2007
WO 2006/119920 A1 11/2006

OTHER PUBLICATIONS

Wolfe et al. "Dynamic control of optical-core/optical-cladding liquid waveguides", PNAS, vol. 101, pp. 12434-12438, (2004).
Blankenbach et al. "Novel highly reflective and bistable electrowetting displays", Journal of the SID, vol. 16, pp. 237-244, (2008).
Feenstra et al. "Liquavista electrowetting displays", white paper, www.liquavista.com (Jan. 2006).

*Primary Examiner* — Christopher S Kelley
*Assistant Examiner* — Hee-Yong Kim
(74) *Attorney, Agent, or Firm* — Saul Ewing LLP (57) ABSTRACT

A 3D display device with controllable device for tracking visibility regions is disclosed, and includes a controllable device for tracking a visibility region, generated by way of superposition of light source images, in a observer plane of the display device. In preferred embodiments, the cladding of a waveguide comprises at least one material with optical properties of an anisotropic liquid, or at least two materials with optical properties of an isotropic liquid; a matrix arrangement of control electrodes defines multiple positions to be generated for local exit points in the cladding of the waveguide at which the total reflection is locally cancelled; and a system controller modifies positions of the output coupling points for superposing the output-coupled light through the lens array to the visibility region by displacing an output coupling point, or by switching off one output coupling point and switching on another one.

21 Claims, 5 Drawing Sheets

3D DISPLAY DEVICE WITH CONTROLLABLE DEVICE FOR TRACKING VISIBILITY REGIONS

CROSS-REFERENCE TO RELATED APPLICATIONS

This application is based on and claims priority to German Application No. DE 10 2009 003 069.7, filed May 13, 2009, the entire contents of which are fully incorporated herein by reference.

BACKGROUND OF THE INVENTION

The present invention relates to a display device for three-dimensional representation of a 3D scene, which is visible for an observer eye from at least one visibility region. The display device includes a controllable device for tracking the at least one visibility region in an observer plane of the display device, where the main component of said tracking device is based on a controllable optical waveguide. The display device further comprises a controllable spatial light modulator (SLM) with a pixel matrix for modulating the light, and a system controller unit for controlling the electrode arrangement. The tracking device comprises at least one light source which emits light, the controllable waveguide for guiding the light, an electrode arrangement, and an lens array with lenses.

The display device can for example be used as an autostereoscopic or holographic display for the three-dimensional representation of holographic or stereoscopic video sequences. Used as a holographic display device, it serves for generating a coherent plane wave field using the light which is coupled out of the waveguide. The wave field is directed at a controllable spatial light modulator means (SLM) on which e.g. a hologram of a scene is encoded with complex values. In the holographic display device, the SLM often serves as the holographic screen at the same time. The display device can be used for 3D representations for multiple observers. The display device can also be used in autostereoscopic displays.

A coherent plane two-dimensional wave field which exhibits sufficient temporal and spatial coherence is needed for generating a holographic reconstruction of a spatial scene in a holographic display device. This means that a planar wave field with a sufficiently small plane wave spectrum is to be realised with the help of light sources. Lasers, which are known to emit coherent light, are generally used as light sources. Alternatively, a multitude of LEDs arranged in a matrix, which normally emit incoherent light, can be used as light sources. If the light which is emitted by the LEDs is filtered spatially and/or temporally, it will be given the sufficient coherence which is required for holographic representations. However, the larger the diagonal of a controllable spatial light modulator (SLM), the greater the demands made on the coherence and representation quality in the holographic display device.

An illumination device in a holographic display device requires a certain number of point light sources or, for a one-dimensionally encoded hologram, a certain number of line light sources to achieve an efficient illumination in order to generate a visibility region.

For certain tracking methods, which take advantage of controllable electrowetting prisms (EW prisms) arranged in a prism array, the light sources can have a fix position. The light follows an observer in that the angles of the EW prisms are variable and adjusted accordingly by the controller. For other tracking methods, e.g. such methods that take advantage of light source tracking, the position of those light sources must be variable.

A known solution for a light source tracking is to use a backlight in conjunction with a shutter display, as described in document EP 1776614 (A1) filed by the applicant. In a shutter display, individual pixels or pixel groups can be controlled such to be switched to a transmissive mode, while others are switched to an absorbing mode. The transmissive pixels serve as light sources. Individual pixels are preferably used for holographic full-parallax encoding, and line-shaped groups of pixels are preferably used for holographic single-parallax encoding on the SLM of the holographic display device or for stereoscopic 3D display devices. Alternating positions of light source images can be realised by controlling the shutter pixels accordingly.

However, a great disadvantage of such a display device is the very low efficiency in respect to brightness, because the backlight must continuously supply a constant luminous intensity across the entire surface of the shutter panel, while those pixels of the shutter panel which are not switched to the transmissive mode absorb a large portion of the light.

Document U.S. Pat. No. 6,816,140 B2 describes a display device with an LC display panel which takes advantage of LC waveguides, in which light propagates as a result of total internal reflections and which leaves the waveguide towards an observer when a certain voltage is applied. The user can watch displayed information from any position in front of the display. It is the purpose of this arrangement to make the LC display in a flat and lightweight design and as inexpensive as possible. However, a generation and tracking of a visibility region according to the movement of the user does not take place.

It is further commonly known to use a compact surface-emitting light waveguide for illuminating an SLM in a display device. The waveguide is for example a compact slab made of transparent plastic material, where the light is transmitted into the narrow side face of the slab. The thickness of the transparent slab can for example vary as the slab exhibits a wedge-shaped angle between its two large surfaces, and the surface which faces the display panel can have a structure of microprisms. This design serves to achieve a preferred polarisation of the light to be emitted. In order to increase the portion of the useful light, it is known to apply a depolarising diffuser foil on the back surface of the plastic slab. This is also referred to a polarisation recycling. The multiply reflected light is emitted from the entire surface of such a waveguide. The angular range of the light that leaves the waveguide is for example around 30°, and is by a factor of 1800 larger than the angular resolution of the human eye. This type of light waveguide is not suited for generating a plane wave field which is meant to illuminate an SLM and e.g. to generate a holographic reconstruction. The light beams must only contain portions of plane waves which mutually diverge by an angle of $\leq \frac{1}{20}°$ if they are collimated to form a plane wave field.

It is further known to use as fix light sources striped waveguides which are designed in the form of parallel stripes to form a compact backlight and which exhibit at defined fix positions output coupling points for the injected light. This backlight for illuminating the SLM has a higher efficiency than the above-mentioned surface-emitting light waveguide, but due to its concept it is restricted to fix light source positions. In this configuration, the backlight can preferably be used in conjunction with an array of EW prisms for tracking. Only light sources with a low spectral range, i.e. mainly lasers, can be used for EW prism tracking though. In contrast, light source tracking would permit the use of more broadband light sources, such as LEDs. However, the positions of the light sources needed to be variable here.

As is generally known, the striped waveguides are based on the principle of total reflection of the injected light. The light is guided within a medium (core) with a higher refractive index, which is surrounded by a cladding made of a different material with a lower refractive index.

Document [1] U.S. Pat. No. 3,980,395 discloses a switch for optical waveguides based on LC material to be used in communications technology. The light propagates in a waveguide whose core is made of a material with a refractive index N1. The core is surrounded by a substrate with a lower refractive index N0 on the one side, and by a birefringent liquid crystal material with the refractive index N2 on the other side. The birefringent material is connected with spatially structured electrodes. When a voltage is applied to the electrodes, the effective refractive index of the birefringent material is changed in the region between the controlled electrodes, such that light can be injected into or coupled out of the waveguide.

However, using birefringent materials such as liquid crystals has the disadvantage that the effective refractive index also depends on the angle under which the light hits the interface of the two materials. The refractive index difference can thus vary among the individual modes of a multi-mode waveguide.

Further, according to [2] Wolfe et al. "Dynamic control of optical-core/optical-cladding liquid waveguides", PNAS, vol. 101, pp. 12434-12438, 2004, waveguides are known which e.g. use a liquid as a core which is surrounded by a solid material, and waveguides which comprise a liquid core and liquid cladding.

EW cells are designed and controlled in various ways to suit individual display applications. For example, [3] Blankenbach et al. "Novel highly reflective and bistable electrowetting displays", Journal of the SID, vol. 16, pp. 237-244, 2008, shows a highly reflective display device which is binary controllable. When a voltage is applied to a structure of control electrodes, a tinted droplet is moved from one position to another position in a liquid (e.g. oil) within an EW cell. This allows a display of low information density to be realised, e.g. a bar graph display.

Further, a pixelated amplitude display whose EW pixels have an absorbing oil film and a transparent water film is known from [4] Feenstra et al. "Liquavista electrowetting displays", white paper, www.liquavista.com. The oil film is moved aside within an EW pixel when applying a voltage, whereby the EW pixel becomes transparent at the positions where the oil film has been removed, and where the transmitted light can be modulated.

The individual physical forms of the quoted prior art will be detailed again in conjunction with the description of embodiments of the present invention.

SUMMARY OF THE INVENTION

It is an object of the present invention to provide a 3D display device for tracking a visibility region which is generated at actual positions of at least one observer eye, which are found by a position finder, by way of superposition of light of light source images. During tracking, the light shall neither get into the other eye of the observer, nor into the eyes of other observers. In order to track the light, the display device shall further comprise a waveguide on which variably positioned output coupling points for the injected lights are generated.

The light sources shall further permit a coherent plane wave field to be generated with high efficiency which exhibits a temporal and spatial coherence that is required for holographic reconstructions.

A solution for this object is based on a display device for a three-dimensional representation of a 3D scene, which is visible for an observer eye which is situated in at least one visibility region. The display device comprises A controllable device for tracking the at least one visibility region in an observer plane, including:
At least one light source which emits light,
At least one controllable waveguide which guides the light, said waveguide having a core and a cladding, and in which the light propagates by way of total internal reflections in the core,
An arrangement of control electrodes for locally applying a voltage to the cladding of the waveguide, where the control electrodes are optionally arranged in stripes or in a matrix and lie in opposition to a base electrode, and
A lens array with lenses which are optionally arranged in stripes or in a matrix,
A controllable spatial light modulator (SLM) with a pixel matrix which modulates the light, and
A system controller unit for controlling the electrode arrangement at the cladding of the waveguide.

The object is generally solved in that the display device comprises an arrangement of electrodes which, when being addressed by the system controller unit, locally modifies the cladding material of the controllable waveguide such that local output coupling points are generated for the transmitted light, which can have variable positions in the waveguide. The display device is thus characterised in that The cladding of the waveguide is made of at least one material with the optical properties of an anisotropic liquid, or of at least two materials with the properties of an isotropic liquid,
The matrix arrangement of the control electrodes defines a multitude of positions to be generated for local output coupling points in the cladding of the waveguide, where the actually addressed control electrodes define a pattern of positions at which the total reflection is locally cancelled, and
The system controller means is configured such to modify the positions of the output coupling points for superposing the output-coupled light through the lens array to at least one visibility region by displacing an output coupling point or by switching off one output coupling point and switching on another one.

In a first embodiment, in the controllable waveguide, the core and the two isotropic liquids exhibit different optical refractive indices such that the light propagation between the core and one of the liquids takes place by way of total reflection, and that the total reflection between the core and the other liquid is disturbed. One of the two isotropic liquids is of a polar type, so that an electrowetting on dielectric (EWoD) arrangement is formed to serve as a waveguide by addressing.

The isotropic liquids can be an oil and a solution of salt in water. The choice of the refractive indices of the liquids to form output coupling points is then based on the salt content of the solution and on the chemical composition of the oil.

The polar liquid is contained in the form of droplets in the nonpolar liquid, so that a droplet between a control electrode and the base electrode forms an output coupling point, where said droplet can be displaced along multiple adjoined control electrodes within a certain range in the cladding by applying voltages to the control electrodes.

In a further embodiment of the display device, a fix number of droplets is defined per lens for output coupling of the light. The droplets can be displaced horizontally and/or vertically in the cladding material, depending on the detected position of observer eyes. According to this invention, a droplet can be displaced in a region of a dimension which corresponds with the width and/or height of a lens of the lens array.

To give an example, a line light source can be realised either by a combination of multiple droplets in line per lens, or by spreading the light in one dimension after its passage through the tracking device in the display device.

According to a further embodiment of the controllable waveguide, the dielectric of the EWoD arrangement has the function of the core. In the EWoD arrangement, the two isotropic liquids are arranged in layers one above the other, and at least one liquid layer is divided by side walls such to form a matrix arrangement of cells, where each cell is addressable by a control electrode and defines the maximum size of an output coupling point. If addressed, these cells form the output coupling points for the output coupling of light. They shall not be mistaken for controllable cells of an SLM which serve to modulate the light.

According to a further embodiment of the display device, the anisotropic liquid of the cladding is birefringent, and the optical refractive index of the core and the birefringence of the anisotropic liquid are mutually adapted such that the propagation of the light between the core and the cladding takes place in the form of total reflection if the optical axes of the molecules of the birefringent liquid have a certain orientation. If the optical axes of the molecules show a different orientation, which is perpendicular to the former, the total reflection is disturbed.

The waveguide is given a cell structure thanks to the matrix arrangement of the control electrodes. By applying a voltage, the cells form output coupling points which can be switched on or off individually. If given cells are switched off while other cells are switched on, the output coupling points can be displaced in the waveguide according to this invention.

In the cell structure, in the cells the anisotropic liquid layer of the cladding which is situated next to the core is an oil film which can be displaced towards a side wall of the cell by applying a voltage to the control electrode of the cell in the on-state, whereby a contact is made between the second liquid layer of the cladding and the core in a defined region of the cell.

The anisotropic liquid is re-oriented in the cell by applying a voltage to the control electrode, whereby the output coupling points are switched on or off. This switching on or off provides the possibility to vary the number of active local output coupling points per lens.

Line light sources can be realised by switching on a row or column of cells. Point light sources can be realised by switching on individual cells.

Alternatively, the cells can be of a striped shape, so to realise a line light source when a cell is switched on.

The anisotropic liquid can comprise an LC material. However, it can also be a mixture of an isotropic liquid and metallic nano-particles of elliptic shape.

According to another embodiment of the display device, a deflection element is disposed between the cladding and lens array, said element serving to deflect the output-coupled light towards the lens array, where the deflection element can be realised either in the form of a diffractive grating or in the form of refractive lenses.

If multiple observers are detected, one output coupling point can preferably be generated per lens and observer for tracking the visibility region.

The object is further solved by a holographic or autostereoscopic display device for a three-dimensional representation of holographic or stereoscopic video sequences, said device including a display device which is designed in accordance with at least one of the preceding embodiments.

The display device according to this invention combines in a controllable tracking device the possibilities of the prior art for generating output coupling points such that the individual advantages are combined and the drawbacks are circumvented or avoided.

BRIEF DESCRIPTION OF THE DRAWINGS

Now, the invention will be described in detail with the help of accompanying drawings, which are schematic views, where.

DETAILED DESCRIPTION

A display device according to this invention comprises as the most important component a controllable tracking device. With the help of the latter, light shall generate for each detected observer eye a visibility region which can be tracked to the observer(s) if they move in front of the display device. Since the visibility region is generated by the light sources, this is achieved so to speak by way of light source tracking. The light sources shall be enabled to move to various new positions, depending on the observer position, from where they generate the new visibility region. For this, pencils of rays which are emitted from a fix light source are transformed into secondary light sources, whose position and/or extent can be modified. The secondary light sources are realised by output coupling points in waveguides.

It is preferably a matrix or stripe-shaped arrangement of secondary point or line light sources that is required in order to get a planar wave field e.g. in a holographic display. The matrix arrangement of control electrodes in the embodiments defines a multitude of possible positions of output coupling points. The light is to guide along these output coupling points and the control electrodes which are assigned to the output coupling points in the waveguide.

Depending on the position of the required visibility region, actual positions of output coupling points can be determined by the system controller unit for this position of the visibility region out of a multitude of possible positions. The total reflection is locally cancelled in the cladding material when control signals which are output by the system controller unit cause a voltage to be applied to the control electrodes in these actual positions. This causes local output coupling points to be generated at those positions, where the light can leave the waveguide.

The light sources are generated in a light waveguide which comprises controllable light guiding elements which are arranged in parallel stripes and which have a core that totally reflects the light and at least one cladding material. Alternatively, the light waveguide comprises planar layers arranged in three dimensions of which at least one layer is controllable and serves as cladding. The non-controllable layer serves as the core of the waveguide. The at least one controllable layer, which can be for example a liquid or a liquid crystal (LC) material, can be controlled such to become transparent by way of addressing control electrodes accordingly. Such regions serve as output coupling points for the light, which is multiple reflected, or as secondary light sources, which are arranged in a line or matrix pattern on the surface of the light waveguide. According to this invention, they can be generated at different positions in this layer.

The light waveguide will be referred to simply as waveguide below.

As is commonly known, the display device comprises a position finder (not shown) to detect the observer positions, said position finder communicating with the system controller unit such that the visibility region is tracked to the new position of the observer(s), and that a three-dimensional image representation can thus be realised.

Figure 1:
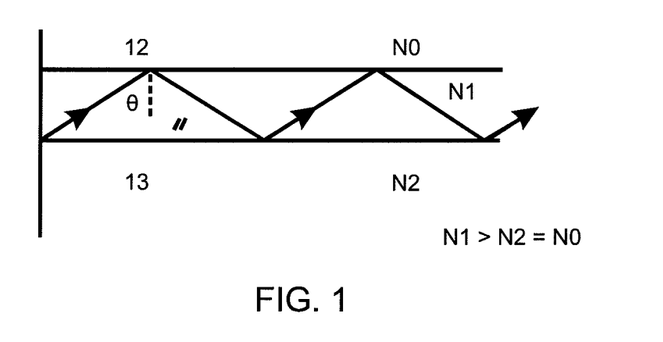
FIG. 1 is a side view which shows a waveguide according to the prior art in which light propagates by way of total reflection.
Figure 2:
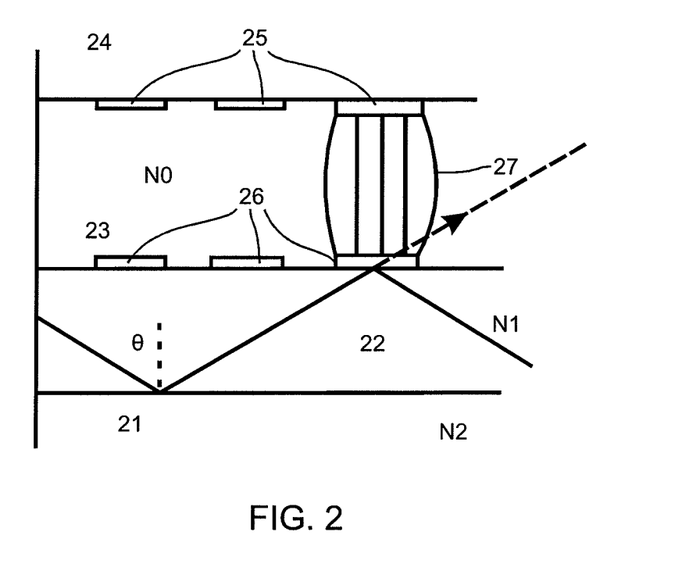
FIG. 2 shows the waveguide of FIG. 1 with an output-coupled light beam.

FIGS. 1 and 2, which represent the prior art [1], show an embodiment of a waveguide with propagating light, where the materials of the waveguide make output coupling of light possible if they are controlled accordingly.

Referring to FIG. 1, the core 11 of the waveguide has the refractive index N1, and the surrounding cladding materials 12 and 13 have lower refractive indices N0 and N2. The light of one mode is guided due to total internal reflection (TIR) in the core 11 under an angle θ. The light which is emitted by a light source (not shown) is injected in a known manner into the waveguide through a side face.

Referring to FIG. 2, a material 22 with the refractive index N1 forms the core of the waveguide, and its lower side is surrounded by a substrate 21 with a refractive index N2, and its upper side is surrounded by an LC layer 23 with an effective refractive index N0 which can be controlled by electrodes 25 and 26. Since the LC layer 23 is made of a birefringent material, the effective refractive index N0 can be modified for a given direction of light propagation by way of a reorientation of the LC molecules, i.e. of the optical axis of the birefringent material. Similar to an LC display panel, the molecules in the cladding of the waveguide can preferably be oriented by surface forces on the one hand and by electrical fields on the other. The LC material is chosen such that an orientation of the LC layer through surface forces brings about an effective refractive index N0<N1, preferably N0≅N2, so that a total reflection takes place between core and cladding. If the LC molecules are oriented in an electric field, N0 becomes larger, so that the total reflection will cease to take place.

The molecules of the LC layer 23 are oriented accordingly in the region of an electric field 27 which is created between two opposing electrodes 25, 26. Consequently, this region does not cause reflection, but allows the propagating light to be coupled out of the core 22, which is indicated by a broken line with an arrow in the drawing. The light leaves the waveguide under the exit angle θ.

A thus designed waveguide forms the basis for a first embodiment of a display device according to this invention, with which a device for tracking light and thus for tracking a visibility region generated by that light can be realised when the observer moves laterally and/or horizontally.

The tracking device in the display device has the following function: The LC layer with the birefringent material is connected with spatially structured, transparent control electrodes. The control electrodes are arranged on at least one face of the LC layer as a matrix or in stripes in the cladding, thus defining potential output coupling points in the LC layer. A continuous electrode is disposed on the other face of the LC layer, very much like in conventional LC display panels. If a voltage is applied to at least one control electrode, then the total reflection is cancelled between this electrode and the opposite electrodes in this position in the matrix or striped arrangement of control electrodes, thus creating an output coupling point.

If such an arrangement is used in a holographic display, it must be noted that the dimension of an output coupling point affects the coherence properties of the leaving light, in particular where LED-based light sources are used. The dimension of the output coupling point can be adjusted by dimensioning the electrodes of the matrix or striped arrangement accordingly. Individual output coupling points do not have to exhibit mutual coherence though. The distance between adjacent control electrodes, i.e. the step width at which the position of an output coupling point can be varied, is in proportion with the step width at which a visibility region can be tracked to an observer eye. The given arrangement of the electrodes defines a fix pattern of light output coupling points.

In a multi-user system, multiple visibility regions are necessary to serve multiple users. These visibility regions can be generated sequentially. This means that an output coupling point is displaced sequentially such that it generates the visibility regions for the individual users one after another. According to another preferred embodiment, multiple visibility regions, in which the same 3D scene is presented to multiple users, are generated simultaneously.

Consequently, one output coupling point must then be generated per user and lens. The number of activated output coupling points can for example be adapted to the number of users which are actually situated in front of the display device.

Figure 5:
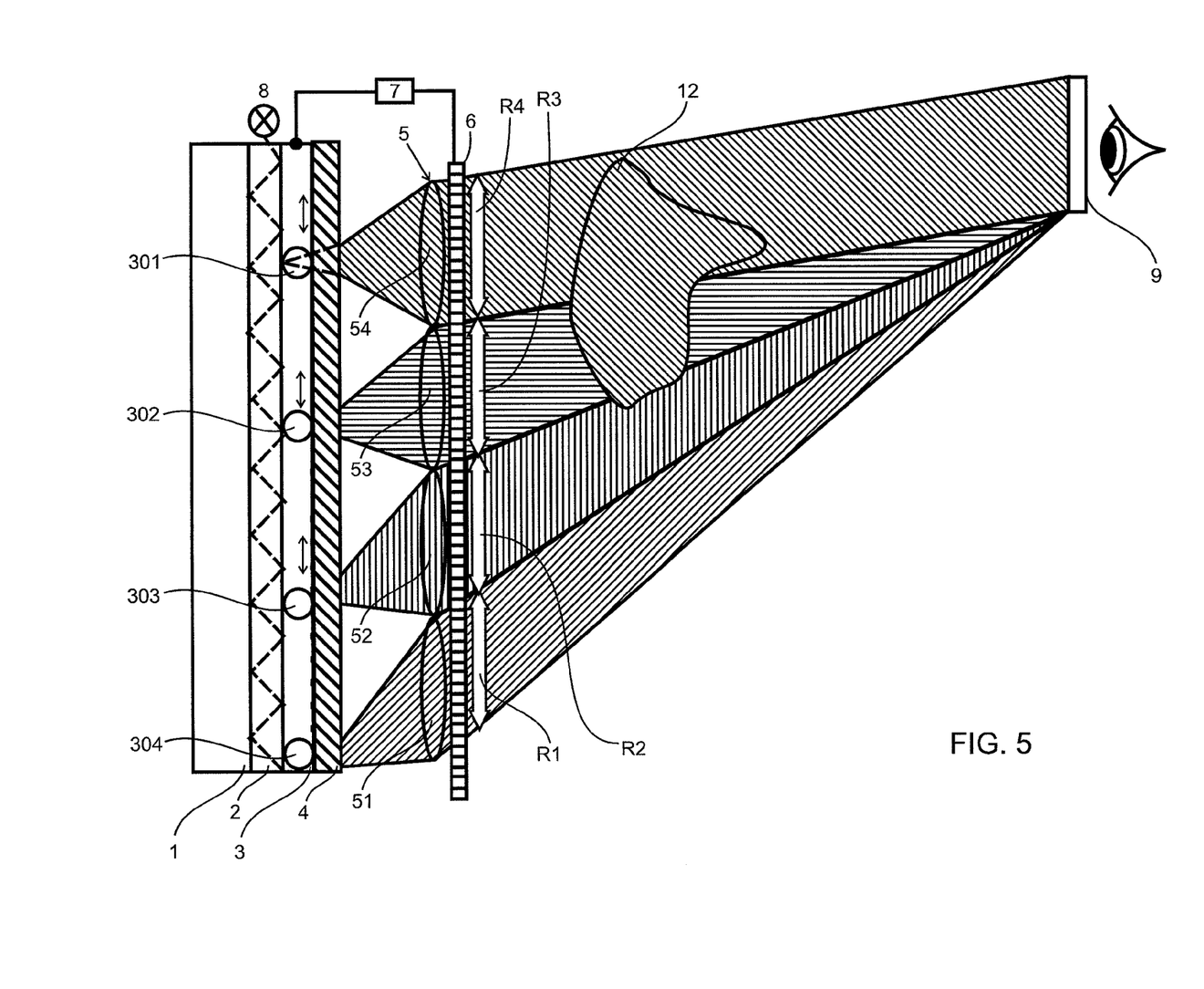
FIG. 5 is a top view which shows an embodiment of a display panel according to this invention in the form of a direct-view display based on FIG. 3.

In order to be able to realise the first embodiment of the display device according to this invention, the light which leaves the waveguide at an oblique angle θ must be deflected towards lenses of a lens array 5 which is disposed in the optical path, for example as shown in FIG. 5. Because the fix pattern of output coupling points comprises multiple output coupling points per lens, at least one output coupling point must typically be selected and activated per lens in order to generate the visibility region. A deflection element 4 is required as an additional optical element in order to direct the leaving light at the observer eye. It can preferably be disposed very close to the LC layer 23, or be directly connected to it. The deflection element 4 can be a diffraction grating, e.g. a Bragg grating. Because the exit angles θ of the light which leaves the waveguide are known, the diffraction grating is adapted to these angles during manufacture.

Alternatively, fix prisms can realise this deflection. The dimension of the prisms must in that case be adapted to the distance between adjacent electrodes in the cladding, i.e. to the step width of the output coupling points.

The following embodiments are based on a waveguide which comprises water (or a water-salt solution) and oil which serve as liquids. They shall only be understood as examples for the use of polar and nonpolar liquids, which can be used for total reflection and light exit, respectively, thanks to their refractive indices.

Figure 3:
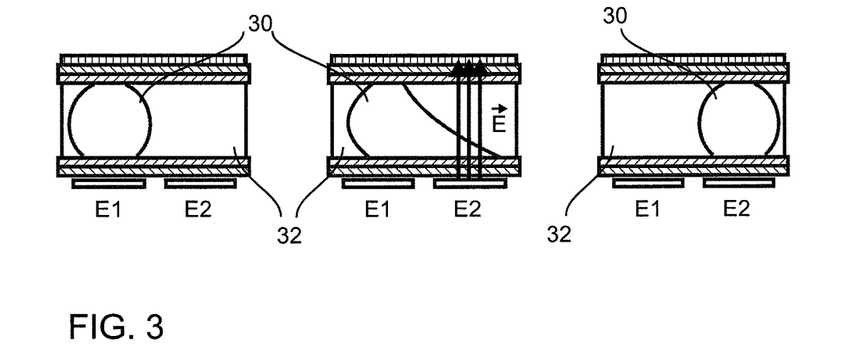
FIG. 3 is a side view which shows a binary controlled pixel in the form of an electrowetting cell (EW cell) according to the prior art.

FIG. 3 shows schematically the design of a pixel which uses the principle of electrowetting, representing the prior art [3]. In the EW arrangement, switchable control electrodes E1 and E2 are assigned to a pixel. The EW arrangement comprises a non-controllable liquid 32, e.g. an oil, in which droplets 30 of water are contained as polar material. The pixel can be controlled binary, in that the water droplet 30 is moved locally in the oil layer, so to switch the pixel between a transparent and a non-transparent condition. This serves to display or hide a piece of information.

The pixel functions as follows: On the upper face there is a common electrode for all pixels, which is also referred to as a base electrode. The lower face accommodates in a substrate pairs of control electrodes E1 and E2 in a matrix arrangement, so that each pixel can be controlled independent of the other pixels. The two liquids are disposed between the base electrode and the control electrodes E1 and E2. The droplet 30 is initially situated above the electrode E1. If an electric field is applied to the electrode E2, the droplet 30 of water will be displaced from its position at electrode E1 (drawing on the left) to a position at electrode E2 (drawing on the right). When the electric field is turned off, it will remain in the position at electrode E2. This process is reversible. If a field is applied to electrode E1, the droplet 30 can be moved back again.

For the application as a display according to the prior art, an absorbing layer over one of the electrodes serves to make the pixel transmissive in one position of the droplet 30 and absorbing in the other position.

If the droplet 30 is situated at the electrode E1 then the pixel is on, if the droplet 30 is situated at the electrode E2 then the pixel is off, or vice versa. This EW arrangement realises a display device with binary switchable pixels.

This principle forms the basis of a second embodiment according to this invention of the display device with a controllable tracking device, which serves to illuminate a SLM and to generate a visibility region. This embodiment will be described in more detail below.

An arrangement of droplets of one liquid in a second liquid forms the cladding of a waveguide.

The refractive index difference between the cladding and the core is adjusted by choosing liquids with a suitable refractive index such that the total reflection is only cancelled in the region of the droplet, so that an output coupling point is generated there and that light can leave the waveguide. The displacement of the droplet does thus not serve to turn a pixel on or off, as in [3], but to move an output coupling point from an old to a new position.

In contrast to the prior art, electrodes are not combined in pairs to form a pixel, but each individual electrode of a matrix or striped arrangement defines the position of a possible output coupling point of the waveguide.

The arrangement is controlled such that a droplet can be moved along a number of electrodes. For example, in an arrangement of three electrodes E1, E2 and E3 a droplet would move from E1 to E3 via an intermediate electrode E2, when sequentially a voltage was applied to the electrode E2 first, and then a voltage was applied to the electrode E3.

In the display device with a lens array, the liquid of the cladding typically comprises at least one single droplet per lens. A fix number of droplets per lens is preferred, so that a fix number of output coupling points is created. It is alternatively possible to define positions to which a droplet can be displaced if no light is to be coupled out, e.g. by additional absorbing layers on individual selected electrodes, and thus to vary the number of active output coupling points.

The position of the droplet on the planar or striped waveguide defines the position of the light source of the assigned lens. The droplet is displaced in accordance with the actually detected eye position to achieve observer tracking.

A large number of electrodes Ei,j is used per lens in order to realise variable output coupling points for the injected light for a one- or two-dimensional arrangement of light sources. A droplet is displaced horizontally and/or vertically to a defined position in order to realise light source tracking.

Displacing the positions of the output coupling points across multiple electrodes is realised by generating a sequence of voltage pulses at a fast pace to be applied one after another to the individual electrodes, where the distance between the addressed electrodes corresponds with the distance to be covered by the droplet to get from the old position to the new position of the output coupling point.

This displacement is controlled by the system controller unit, which processes the position information provided by a position finder in real time, determines based on this information the electrodes which must be addressed, and transmits voltage signals.

The position information of possible observer positions can also be readily available in a memory unit. They are matched with corresponding sequences of electrodes to be controlled in order to change the position of the output coupling points.

A horizontal displacement of the droplets e.g. from position 2 to position 5 can be performed in that voltages are applied one after another to adjacent control electrodes which are assigned to these positions. The droplet is thus displaced from position 2 to position 3, from position 3 to position 4, and from there to position 5.

In a further form of this embodiment line light sources can be realised too by combining multiple droplets side by side or one below another per lens in a plane perpendicular to the direction of light propagation, or by spreading the light beam in one direction e.g. by a diffuser that follows in the optical path.

An electrowetting arrangement requires in addition to liquids and electrodes a dielectric between the liquid and each of the electrodes.

It is possible to design the cladding of the waveguide such that it comprises the entire electrowetting arrangement, i.e. electrodes, dielectric and liquids.

In this case there is no direct contact between the core and the liquids in the cladding, because they are separated by an electrode and a dielectric. These must therefore be sufficiently thin, and their optical properties must be adapted such that they do not impair switching between the conditions with and without total reflection.

In a preferred embodiment, the core of the waveguide is formed by one of the dielectrics of the electrowetting arrangement itself.

A planar waveguide can be designed such that a solid substrate forms the lower-side cladding. A continuous base electrode is applied on top of that substrate, as shown in FIG. 3. On top of that there is a first dielectric, which represents the core of the waveguide, and further atop there are the liquids which form the upper-side cladding of the waveguide together with a second dielectric and the structured electrodes.

This possibility can be used in the second embodiment described above with the droplets, but also in the embodiment described below with switchable cells.

Figure 4:
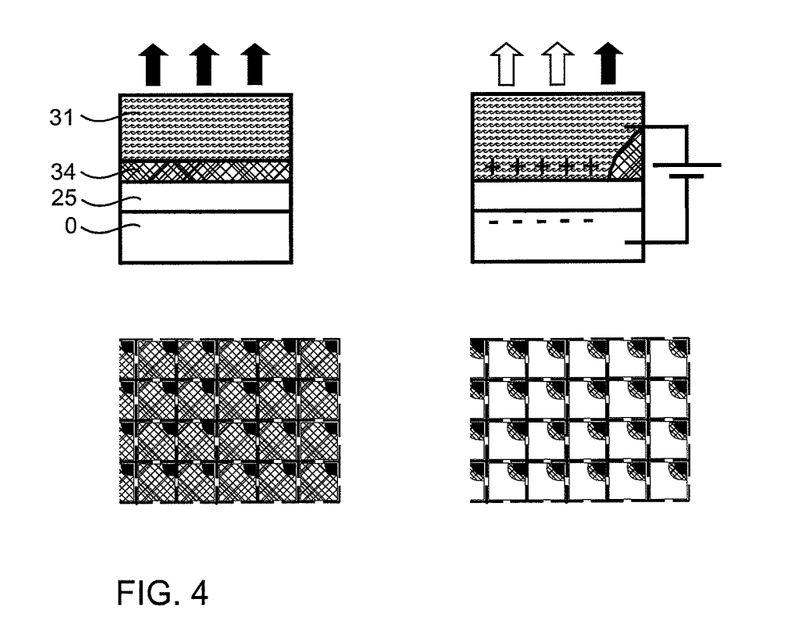
FIG. 4 shows a display panel with EW cells according to the prior art which turn from a non-transparent condition (a; c) into a transparent condition (b; d) if being addressed, both in a side view (a; b) and in a top view (c; d)

FIG. 4 illustrates the prior art [4] in a simplified diagram. It shows the principle of a conventional EW display panel in the form of an amplitude-modulating display panel, where an absorbing oil film 34 is contracted in one corner of the pixel if a voltage is applied. The pixels become transparent for the light where the oil film 34 is retracted so that there is a direct contact to the second layer, a water-salt solution 31. A dielectric 25 is disposed between the water-salt solution 31 and the base electrode 0. This arrangement only requires relatively low voltages to control the EW cells in comparison with other types of EW cells.

According a third embodiment according to this invention of the display device, variable output coupling points can be created by switching on and off the control electrodes in application of this principle.

Like in the first embodiment, the electrodes can be arranged in a matrix or in stripes in the waveguide, so that the output coupling points exhibit an according pattern. An output coupling point is turned on by applying a voltage to one of the electrodes.

The dielectric 25 of the EW cells can serve as the core of the waveguide, as described above. Alternatively, the dielectric can be a very thin layer disposed between the core and the liquids.

Deviating from the prior art described above, the oil 34 is not absorbing, but transparent. However, the chemical composition of the oil is chosen such that it has a lower refractive index than the core of the waveguide, so that total reflection occurs between the core and the oil in this arrangement.

If the oil film 34 is retracted by the applied voltage, the dielectric 25 comes in contact with the other liquid, the water-salt solution 31. The refractive index of the latter is chosen such that it is higher than that of the oil 34, so to prevent the occurrence of total reflection between the core and the water-salt solution.

In the prior art it is possible to change the refractive index of water by mixing it with salt. The actual refractive index depends on the salt concentration in the solution.

In the present example, total reflections will no longer occur in the waveguide, but the light will exit through the oil-free region of the EW cells.

This embodiment also differs from that illustrated in FIG. 3 in that the waveguide of the controllable tracking device is no component with continuous oil film. In the waveguide according to this invention, cells which are arranged in stripes or in a matrix can be controlled discretely, where each cell has the two layers of water and oil. The oil films in the individual cells are separated by side walls, so that the oil film can be controlled in individual cells without affecting other cells.

This embodiment realises a fix arrangement of EW cells in which the individual cells can be controlled discretely so to create output coupling points.

The EW cells can be designed to have a striped form for an encoding of the SLM in one dimension, which reduces the complexity of the control.

In the matrix type of the waveguide, the position of at least one output coupling point or cell can be varied in two dimensions.

For example, in a planar waveguide the position of the output coupling points can be changed point by point horizontally and/or vertically. For this, a given voltage value is applied to the electrode which is assigned to this value in order to displace the output coupling point from its old position to a new position horizontally and/or vertically.

Output coupling points which realise line light sources can also be created.

The cells are then not of an almost square shape, but rather of an almost linear shape. In this case, the oil is not retracted towards a corner, but towards a longitudinal side wall of the cell, which results in the striped arrangement of output coupling points.

The first and third embodiment described above also comprise additional optical elements, such as a deflection element, which deflects the leaving light towards the lenses of the lens array.

Both in the first and third embodiment, an output coupling point is created by applying a single given voltage value between a control electrode and the base electrode. The position or number of output coupling points is varied in that certain output coupling points are turned on and others are turned off. In contrast, in the second embodiment, which was illustrated in FIG. 3, a sequence of voltage values is applied to different electrodes at a fast pace, in order to displace the output coupling points from one position to at least one other position.

FIG. 5 is a sectional view that shows in more detail a part of a display device according to this invention with a controllable tracking device which is based on a waveguide for the reconstruction of a 3D scene.

The tracking device comprises a substrate 1 which accommodates a core 2, an electrowetting layer 3 with droplets of water in oil, and an additional deflection element 4. The deflection element 4 deflects the output-coupled light towards the lens array 5. The deflection element 4 can also be a diffuser. The lens array 5 is followed by an SLM 6. A system controller unit 7 controls both the cladding material of the waveguide and the SLM 6. A primary light source 8 illuminates the waveguide through a side face with coherent light of one diffraction order, which propagates through the core 2 by way of total internal reflection (TIR). The light leaves the waveguide at the output coupling points 301 to 304 in the cladding 3, namely where the droplets are situated, in lines, and the output coupling points thus serve as secondary light sources which illuminate the SLM 6.

Each of the horizontally arranged lenses 51 to 54 focuses the light from the output coupling point 301 to 304 in the centre of a visibility region 9. If a suitable hologram is written to the SLM 6, a reconstruction 12 of a 3D scene is visible for a right or left eye of an observer from the visibility region 9.

The display device is shown as a holographic display device, where the displacement of the droplet in one dimension can be taken advantage of to realise output coupling points 301 to 304.

It is optionally possible to use an arrangement which would look the same if turned by 90°, i.e. a matrix arrangement of output coupling points 301 to 304 with the possiblility of displacement, and which comprises a two-dimensional array of spherical lenses.

Alternatively, it is possible to use an arrangement where the displacement only takes place in one direction. The droplet can there extend to form a line which is situated perpendicular to the plane in FIG. 5. In that case, the lenses 51 to 54 would be cylindrical lenses. The SLM 6 would then preferably be filled with a hologram with vertical-only parallax information.

The output-coupled light that is deflected by the deflection element 4 towards the lens array 5 illuminates the hologram, where each lens 51 to 54 illuminates a separate hologram region R1 to R4. All light sources which are generated in the tracking device in the form of output coupling points 301 to 304 this way illuminate the hologram which is encoded on the SLM 6 and which creates the reconstruction 12. In the present example, the reconstruction 12 is created commonly by the hologram regions R2 to R4.

The positions of the output coupling points 301 to 304 are adapted individually to the eye position of the right or left eye of the observer by applying the voltage at the cladding 3 at the droplets e.g. of a water-salt solution.

The water droplets are moved within a given range by varying the voltage in the cladding 3, where said range corresponds with one lens 51 to 54 of the lens array 5 and represents one output coupling point region. A new visibility region 9 is generated for one eye depending on the actual observer position with the light of all output coupling points 301 to 304. The position of the output coupling points 301 to 304 and thus the position of the visibility region 9 can be varied by changing the position of the water droplets.

Figure 6:
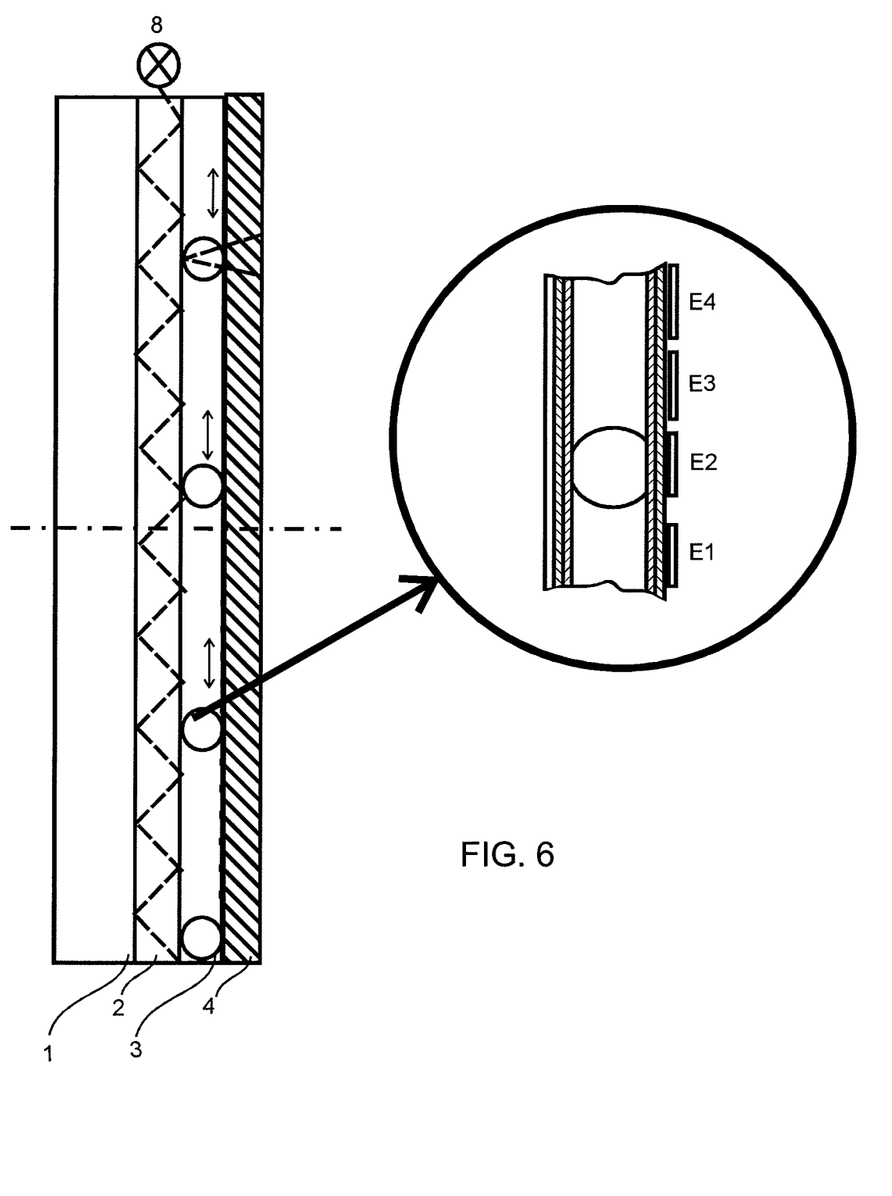
FIG. 6 is a top view which shows the controllable illumination and tracking device according to FIG. 5, with a detailed illustration of an output coupling point and of control electrodes.

FIG. 6 shows the tracking device based on FIG. 3 in a display device for 3D representations in a schematic diagram. This drawing serves mainly to show in an enlarged detail that a droplet, which has a spherical form in the drawing, was displaced to the position at the control electrode E2. This leads to the effect that the total reflection of the light which is emitted by the light source 8 and which propagates through the core 2 is cancelled at that position, thus creating an output coupling point in the cladding 3 for output coupling of the light.

Figure 7:
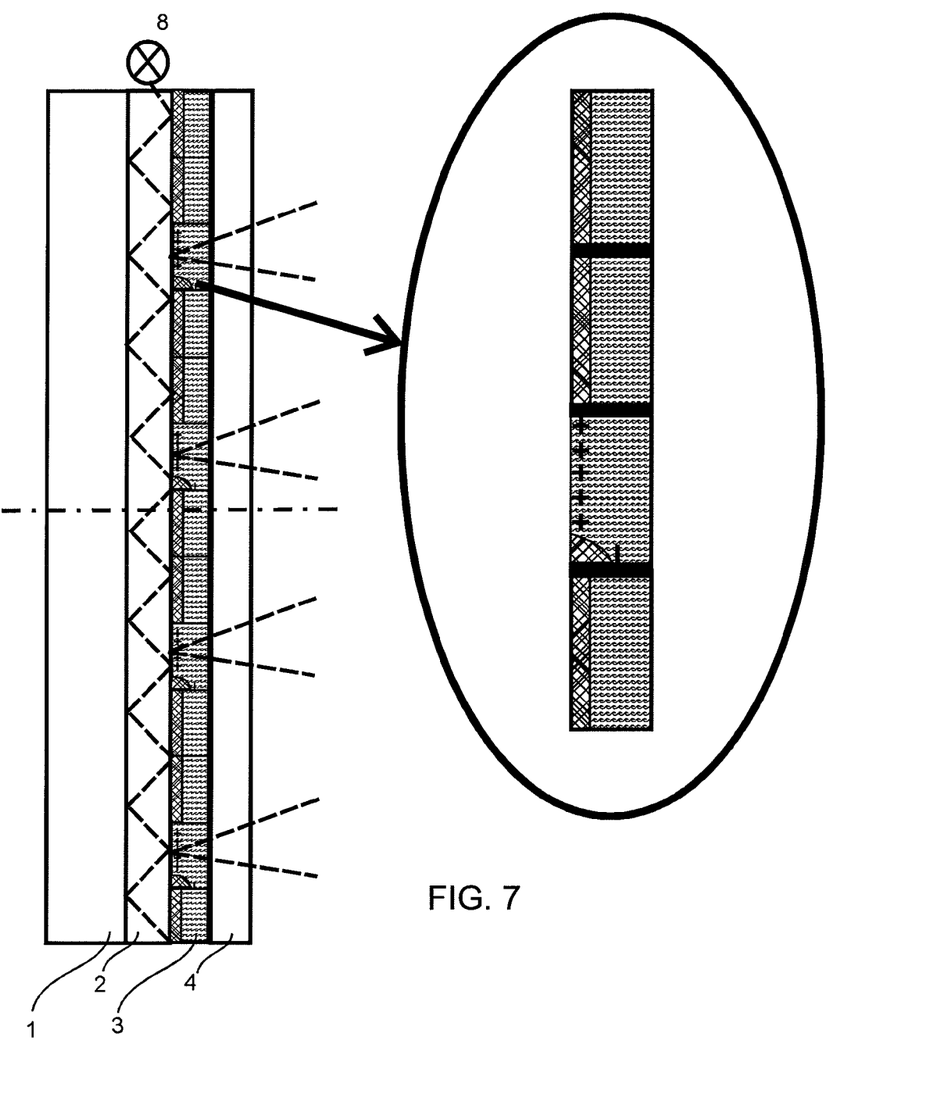
FIG. 7 is a top view which shows the controllable illumination and tracking device of the display based on FIG. 4, with a detailed illustration of an output coupling point.

FIG. 7 shows schematically—with reference to FIG. 4—an embodiment for switching on and off output coupling points in the display device.

This drawing shows a detail of a matrix arrangement of discretely controllable positions of the EWoD arrangement, which serves as the cladding 3 of the waveguide. Every third EWoD cell is currently being addressed, i.e. supplied with a voltage, which can be seen in the detail showing four EWoD cells. The applied voltage serves to move aside the oil film in an EWoD cell, thus creating an output coupling point. If the voltage is turned off, the oil film will spread across the entire cell again, and light is no longer coupled out of the core 2.

This combination of an illumination device and a tracking device based on a waveguide serves to realise a display device which in contrast to conventional display devices only features one additional layer, which simultaneously represents the core of the waveguide. A wide variety of suitable materials is available to be combined in order to achieve a refractive index difference that is able to cancel the total reflection. The display device comprises as additional elements at least one SLM which is also controlled by the system controller unit. The image information or other data to be displayed are encoded on the SLM and modulate the transmitted light accordingly.

The combined illumination and tracking device exhibits a high efficiency because light only exits at positions where it is actually needed, while these output coupling points can be activated variably.

The invention claimed is:

1. Display device for three-dimensional representation of a 3D scene, which is visible for an observer eye from at least one visibility region, With a controllable device for tracking the at least one visibility region in an observer plane, including:
At least one light source which emits light,
At least one controllable waveguide which guides the light, said waveguide having a core and a cladding, and in which the light propagates by way of total internal reflections in the core,
An arrangement of control electrodes for locally applying a voltage to the cladding of the waveguide, where the control electrodes are optionally arranged in stripes or in a matrix and lie in opposition to a base electrode, and
A lens array with lenses which are optionally arranged in stripes or in a matrix,
With a controllable spatial light modulator (SLM) with a pixel matrix which modulates the light, and
With a system controller unit for controlling the electrode arrangement at the cladding of the waveguide,
wherein
The cladding of the waveguide is made of at least one material with the optical properties of an anisotropic liquid, or of at least two materials with the properties of an isotropic liquid,
The matrix arrangement of the control electrodes defines a multitude of positions to be generated for local output coupling points in the cladding of the waveguide, where the actually addressed control electrodes define a pattern of positions at which the total reflection is locally cancelled, and
The system controller means is configured such to modify the positions of the output coupling points for superposing the output-coupled light through the lens array to at least one visibility region by displacing an output coupling point or by switching off one output coupling point and switching on another one.

2. Display device according to claim 1, wherein the core and the two isotropic liquids exhibit different optical refractive indices such that the light propagation between the core and one of the liquids takes place by way of total reflection, and that the total reflection between the core and the other liquid is disturbed.

3. Display device according to claim 2, wherein one of the two isotropic liquids is of a polar type and if addressed an electrowetting on dielectric (EWoD) arrangement is formed to serve as a waveguide.

4. Display device according to claim 2, wherein the isotropic liquids are an oil and salt-containing water, and where choice of the refractive indices of these liquids is made depending on the actual salt content of the water and on the chemical composition of the oil.

5. Display device according to claim 3, wherein the polar liquid is contained in the form of droplets in the unpolar liquid, and where a droplet between a control electrode and the base electrode forms an output coupling point, where said droplet can be displaced along multiple adjoined control electrodes within a certain range in the cladding by applying voltages to the control electrodes.

6. Display device according to claim 5, wherein a fix number of droplets is defined per lens or wherein where a line light source can be realised either by a combination of multiple droplets in line per lens, or by spreading the light in one dimension after its passage through the tracking device, and wherein a fix number of droplets is defined per lens and wherein a line light source can be realised either by a combination of multiple droplets in line per lens, or by spreading the light in one dimension after its passage through the tracking device.

7. Display device according to claim 6, wherein the droplets can be displaced horizontally and/or vertically in the cladding material and where a droplet is displaceable in a region of a dimension which corresponds with the width and/or height of a lens of the lens array.

8. Display device according to claim 3, wherein the dielectric of the EWoD arrangement has the function of the core.

9. Display device according to claim 3, wherein the two isotropic liquids are arranged in layers one above the other, and where at least one liquid layer is divided by side walls such to form a matrix arrangement of cells, where each cell is addressable by a control electrode and defines the maximum size of an output coupling point.

10. Display device according to claim 1, wherein the anisotropic liquid of the cladding is birefringent, and the optical refractive index of the core and the birefringence of the anisotropic liquid are mutually adapted such that the propagation of the light between the core and the cladding takes place in the form of total reflection if the optical axis of the anisotropic liquid has a certain orientation, and where the total reflection is disturbed if the optical axis has a different orientation which is perpendicular to the former.

11. Display device according to claim 10, wherein the waveguide is given a certain cell structure by the matrix arrangement of the control electrodes.

12. Display device according to claim 11, wherein the cells, which serve as output coupling points, can be switched on or off individually by applying a voltage.

13. Display device according to claim 12, wherein the output coupling points are displaceable by way of switching off certain cells and switching on other cells, and wherein the number of active local output coupling points per lens is varied by switching on and off certain output coupling points.

14. Display device according to claim 10, wherein in the cell the liquid layer of the cladding which is situated next to the core is an oil film which can be displaced towards a side wall of the cell by applying a voltage to the control electrode of the cell in the on-state, whereby a contact is made between the second liquid layer of the cladding and the core in a defined region of the cell.

15. Display device according to claim 12, wherein the anisotropic liquid is re-oriented in the cell by applying a voltage to the control electrode, whereby the output coupling points are switched on or off.

16. Display device according to claim 12, wherein optionally point light sources are realised by switching on individual cells and line light sources are realised by switching on a row or column of cells.

17. Display device according to claim 12, wherein the cells are of a striped shape, so to realise a line light source when a cell is switched on.

18. Display device according to claim 1, wherein the anisotropic liquid is a mixture of an isotropic liquid and added elliptic metallic nano-particles.

19. Display device according to claim 1, wherein a deflection element is disposed between the cladding and lens array, said deflection element serving to deflect the output-coupled light towards the lens array, where the deflection element is realised either in the form of a diffractive grating or in the form of refractive lenses.

20. Display device according to claim 19, wherein one output coupling point is generated per lens and observer for tracking the visibility region for each detected observer.

21. Holographic or autostereoscopic display device for a three-dimensional representation of holographic or stereoscopic video sequences, said device including a display device according to claim 1.

* * * * *